(12) United States Patent
Li et al.

(10) Patent No.: US 11,544,645 B2
(45) Date of Patent: Jan. 3, 2023

(54) INVENTORY SCHEDULING METHOD AND DEVICE AND NON-TRANSITORY COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Wei Li, Beijing (CN); Hengle Qin, Beijing (CN); Jixin Zhou, Beijing (CN); Hengbin Zhu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 76 days.

(21) Appl. No.: 16/958,467

(22) PCT Filed: Oct. 8, 2018

(86) PCT No.: PCT/CN2018/109301
§ 371 (c)(1),
(2) Date: Jun. 26, 2020

(87) PCT Pub. No.: WO2019/128368
PCT Pub. Date: Jul. 4, 2019

(65) Prior Publication Data
US 2021/0056482 A1    Feb. 25, 2021

(30) Foreign Application Priority Data
Dec. 28, 2017  (CN) .......................... 201711455773.9

(51) Int. Cl.
G06Q 10/06     (2012.01)
G06Q 10/08     (2012.01)
B65G 1/137     (2006.01)

(52) U.S. Cl.
CPC ............... *G06Q 10/06312* (2013.01); *G06Q 10/06315* (2013.01); *G06Q 10/0875* (2013.01); *B65G 1/1378* (2013.01)

(58) Field of Classification Search
CPC ....... G06Q 10/06312; G06Q 10/06315; G06Q 10/0875; B65G 1/1378
(Continued)

(56) References Cited

U.S. PATENT DOCUMENTS 9,466,045 B1 * 10/2016 Kumar ................. G06Q 10/087
2010/0316468 A1   12/2010 Lert, Jr.
(Continued)

FOREIGN PATENT DOCUMENTS

CA    2 988 473 A1    12/2016
CN    103337003 A     10/2013
(Continued)

OTHER PUBLICATIONS

24×7 Academy (M46 Bellman Ford Algm single source (Dec. 2017)) https://www.youtube.com/watch?v=HYefC2QRNbg (Year: 2017).*
(Continued)

*Primary Examiner* — Patricia H Munson
*Assistant Examiner* — Thea Labogin
(74) *Attorney, Agent, or Firm* — Oblon, McClelland, Maier & Neustadt, L.L.P.

(57) ABSTRACT

The present disclosure relates to the technical field of automated warehousing, and relates to an inventory scheduling method and device and a non-transitory computer readable storage medium. The method of the present dis-
(Continued)

closure includes: obtaining an order to be picked, the order to be picked comprising a kind(s) of goods to be picked; determining order processing capability information of each of a plurality of picking workstations, according to at least one of position distribution information of a rack(s) storing at least one kind of the goods to be picked relative to each of the picking workstations, position distribution information of an available transfer machine(s) relative to each of the picking workstations, or load information of each of the picking workstation; and allocating the order to be picked to one of the picking workstations according to the order processing capability information of each of the picking workstations.

13 Claims, 4 Drawing Sheets

(58) Field of Classification Search
USPC ........................................................ 705/7.22
See application file for complete search history.

(56) References Cited

U.S. PATENT DOCUMENTS

| | | |
|---|---|---|
| 2010/0316469 A1 | 12/2010 | Lert, Jr. |
| 2010/0316470 A1 | 12/2010 | Lert, Jr. |
| 2010/0322746 A1 | 12/2010 | Lert, Jr. |
| 2010/0322747 A1 | 12/2010 | Lert, Jr. |
| 2014/0086758 A1 | 3/2014 | Lert, Jr. |
| 2014/0271063 A1 | 9/2014 | Lert et al. |
| 2014/0288696 A1 | 9/2014 | Lert |
| 2015/0266672 A1 | 9/2015 | Lert et al. |
| 2016/0075512 A1 | 3/2016 | Lert, Jr. |
| 2016/0185526 A1 | 6/2016 | Lert et al. |
| 2016/0194153 A1 | 7/2016 | Issing et al. |
| 2017/0137222 A1 | 5/2017 | Lert, Jr. |
| 2017/0137223 A1 | 5/2017 | Lert, Jr. |
| 2017/0362032 A1 | 12/2017 | Sullivan et al. |
| 2017/0369243 A1 | 12/2017 | Lert, Jr. |
| 2018/0016098 A1 | 1/2018 | Lert et al. |
| 2018/0162639 A1 | 6/2018 | Ingram-Tedd et al. |
| 2018/0257863 A1 | 9/2018 | Lert, Jr. |
| 2018/0334325 A1 | 11/2018 | Lert et al. |
| 2019/0168964 A1 | 6/2019 | Lert, Jr. |
| 2019/0218034 A1 | 7/2019 | Caveney |
| 2020/0039744 A1 | 2/2020 | Lert et al. |
| 2020/0172336 A1 | 6/2020 | Sullivan et al. |
| 2020/0346866 A1 | 11/2020 | Lert et al. |
| 2020/0407160 A1 | 12/2020 | Ingram-Tedd et al. |

FOREIGN PATENT DOCUMENTS

| | | |
|---|---|---|
| CN | 106097041 A | 11/2016 |
| CN | 106185152 A | 12/2016 |
| CN | 107025533 A | 8/2017 |
| CN | 107194646 A | 9/2017 |
| CN | 107235276 A | 10/2017 |
| CN | 206622328 U | 11/2017 |
| EP | 2 436 618 A2 | 4/2012 |
| JP | 2001-350984 A | 12/2001 |
| JP | 2009-73661 A | 4/2009 |
| JP | 2009-513457 A | 4/2009 |

OTHER PUBLICATIONS

Lamballais, T. & Roy, Debjit & De Koster, René. (2016). Estimating Performance in a Robotic Mobile Fulfillment System. European Journal of Operational Research. 256. 10.1016/j.ejor.2016.06.063. (Year: 2016).*

Azadeh, Kaveh and de Koster, M.B.M. René and Roy, Debjit, Robotized and Automated Warehouse Systems: Review and Recent Developments (May 30, 2017). Available at SSRN: https://ssrn.com/abstract=2977779 or http://dx.doi.org/10.2139/ssrn.2977779 (Year: 2017).*

Z. Yuan and Y. Y. Gong, "Bot-In-Time Delivery for Robotic Mobile Fulfillment Systems," in IEEE Transactions on Engineering Management, vol. 64, No. 1, pp. 83-93, Feb. 2017, doi: 10.1109/TEM.2016.2634540. (Year: 2017).*

Lamballais, T. & Roy, Debjit & De Koster, René. (2016). Estimating Performance in a Robotic Mobile Fulfillment System. European Journal of Operational Research. 256. 10.1016/j.ejor.2016.06.063. (Year: 2017).*

Azadeh, Kaveh and de Koster, M.B.M. René and Roy, Debjit, Robotized and Automated Warehouse Systems: Review and Recent Developments (May 30, 2017). Available at SSRN: https://ssm.com/abstract=2977779 or http://dx.doi.org/10.2139/ssrn.2977779 (Year: 2017).*

Extended European Search Report dated Apr. 6, 2021 in European Patent Application No. 18896573.5, 10 pages.

International Search Report and Written Opinion dated Jan. 3, 2019 in PCT/CN2018/109301 filed Oct. 8, 2018 (with English language translation), 13 pages.

Combined Chinese Office Action and Search Report dated Sep. 14, 2020 In Patent Application No. 201711455773.9 (with English translation of Category of Cited Documents), 9 pages.

Office Action dated Aug. 1, 2022 in Japanese Patent Application No. 2020-536103, along with an English translation.

* cited by examiner

INVENTORY SCHEDULING METHOD AND DEVICE AND NON-TRANSITORY COMPUTER READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2018/109301, filed on Oct. 8, 2018, which is based on and claims priority of Chinese application for invention No. 201711455773.9, filed on Dec. 28, 2017, the disclosure of both of which are hereby incorporated into this disclosure by reference in its entirety.

TECHNICAL FIELD

The present disclosure relates to a technical field of automated warehousing, and in particular, to an inventory scheduling method, an inventory scheduling device and a non-transitory computer-readable storage medium.

BACKGROUND

Order picking efficiency in contemporary logistics warehouses is an important factor affecting order fulfillment efficiency. The traditional mode is that pickers move to fixed racks with goods in orders to pick the goods according to paths specified by the system, that is, a "picker looking for goods" mode.

With the development of Internet technology, automatic transfer machines have been used in warehouses to move movable racks on which goods in orders are stored to fixed picking workstations, so that the pickers at these picking workstations can pick the goods, in a "goods looking for picker" mode. The application of the automatic transfer machines in a picking system improves the overall order picking efficiency, and the method of allocating an order to a picking workstation determines the overall order picking efficiency and cost of the system. A method generally used in warehouses is that orders to be picked are randomly allocated to picking workstations and then goods are transferred to the picking workstations by transfer machines according to the orders.

SUMMARY

According to some embodiments of the present disclosure, an inventory scheduling method is provided, comprising: obtaining an order to be picked, the order to be picked comprising a kind(s) of goods to be picked; determining order processing capability information of each of a plurality of picking workstations, according to at least one of position distribution information of a rack(s) storing at least one kind of the goods to be picked relative to each of the picking workstations, position distribution information of an available transfer machine(s) relative to each of the picking workstations, or load information of each of the picking workstation; and allocating the order to be picked to one of the picking workstations according to the order processing capability information of each of the picking workstations to pick the goods to be picked in the order to be picked at the picking workstation to which the order to be picked allocated.

In some embodiments, determining order processing capability information of a picking workstation comprises: determining the order processing capability information of each of the plurality of picking workstations comprises: for each of the picking workstations, determining a goods distribution density value corresponding to the picking workstation according to the position distribution information of the rack(s) relative to the picking workstation; determining a transfer machine distribution density value corresponding to the picking workstation according to the position distribution information of the available transfer machine(s) relative to the picking workstation; determining a load capacity value corresponding to the picking workstation according to the load information of the picking workstation; and determining a weighted sum of the goods distribution density value, the transfer machine distribution density value, and the load capacity value corresponding to the picking workstation as the order processing capability information of the picking workstation.

In some embodiments, determining the order processing capability information of each of the plurality of picking workstations comprises: for each of the picking workstations, determining a goods distribution density value corresponding to the picking workstation according to a distance from each of the rack(s) to the picking workstation; and determining the order processing capability information of the picking workstation according to the goods distribution density value corresponding to the picking workstation.

In some embodiments, the goods distribution density value corresponding to the picking workstation is determined according to a sum of a reciprocal of the distance from each of the rack(s) to the picking workstation; or the goods distribution density value corresponding to the picking workstation is determined according to the number of a rack(s) storing at least one kind of the goods to be picked in a preset region corresponding to the picking workstation and a distance from each of the rack(s) in the preset region to the picking workstation In some embodiments, the goods distribution density value (PDV) corresponding to the picking workstation is determined according to the following formula:

$$PDV = 1 \bigg/ \sum_i^N \frac{1}{\sum_j^M \frac{V_{i,j}}{L_{i,j}}}$$

$L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind (s) of the goods to be picked, $1 \le i \le N$, and i is a positive integer, M is the number of a rack(s) storing the goods i to be picked, $1 \le j \le M$, and j is a positive integer.

In some embodiments, for each of the rack(s), the distance from the rack to the picking workstation is set to a preset distance, in a case where the rack is located at the picking workstation or on a way to the picking workstation; wherein for a rack that is not located at the picking workstation and is not on the way to the picking workstation, a difference between a distance from the rack to the picking workstation and the preset distance is greater than a preset value.

In some embodiments, determining the order processing capability information of each of the plurality of picking workstations comprises: for each of the picking workstations, determining a transfer machine distribution density value corresponding to the picking workstation according to a distance from each of the available transfer machine (s) to the picking workstation; and determining the order processing capability information of the picking workstation according to the transfer machine distribution density value corresponding to the picking workstation.

In some embodiments, the transfer machine distribution density value corresponding to the picking workstation is determined according to a sum of a reciprocal of the distance from each of the available transfer machine(s) to the picking workstation; or the transfer machine distribution density value corresponding to the picking workstation is determined according to the number of an available transfer machine(s) in a preset region corresponding to the picking workstation and a distance from each of the available transfer machine (s) in the preset region to the picking workstation.

In some embodiments, determining the order processing capability information of each of the plurality of picking workstations comprises: for each of the picking workstations, determining a load capacity value corresponding to the picking workstation according to at least one of a picking rate of an operator at the picking workstation or the number of a free rack buffer location(s) at the picking workstation; and determining the order processing capability information of the picking workstation according to the load capacity value corresponding to the picking workstation.

In some embodiments, the load capacity value corresponding to the picking workstation is determined according to a weighted sum of the picking rate of the operator at the picking workstation and the number of the free rack buffer location(s) at the picking workstation.

In some embodiments, the method further comprises: determining a picking rack(s) according to at least one of a kind(s) and a quantity of goods to be picked on each of the rack(s), a distance from each of the rack(s) to the picking workstation to which the order to be picked is allocated, or a distance from each of the rack(s) to each of the available transfer machine(s), to pick the goods to be picked from the picking rack(s).

In some embodiments, the method further comprises: for each of the picking rack(s), determining a picking transfer machine for conveying the picking rack according to a distance from each of the available transfer machine(s) to the picking rack.

In some embodiments, the method further comprises: determining a priority of each of a plurality of orders according to at least one of a user requirement or an order type; obtaining the order to be picked comprises: obtaining the order to be picked from the orders according to the priority of each of the orders.

According to still other embodiments of the present disclosure, an inventory scheduling device is provided, comprising: a processer; and a memory coupled to the processor and storing instructions that when executed by the processor, cause the processor to: obtain an order to be picked, the order to be picked comprising a kind(s) of goods to be picked; determine order processing capability information of each of a plurality of picking workstations, according to at least one of position distribution information of a rack(s) storing at least one kind of the goods to be picked relative to each of the picking workstations, position distribution information of an available transfer machine(s) relative to each of the picking workstations, or load information of each of the picking workstation; and allocate the order to be picked to one of the picking workstations according to the order processing capability information of each of the picking workstations to pick the goods to be picked in the order to be picked at the picking workstation to which the order to be picked allocated.

In some embodiments, determining the order processing capability information of each of the plurality of picking workstations comprises: for each of the picking workstations, determining a goods distribution density value corresponding to the picking workstation according to the position distribution information of the rack(s) relative to the picking workstation; determining a transfer machine distribution density value corresponding to the picking workstation according to the position distribution information of the available transfer machine(s) relative to the picking workstation; determining a load capacity value corresponding to the picking workstation according to the load information of the picking workstation; and determining a weighted sum of the goods distribution density value, the transfer machine distribution density value, and the load capacity value corresponding to the picking workstation as the order processing capability information of the picking workstation.

In some embodiments, determining the order processing capability information of each of the plurality of picking workstations comprises: for each of the picking workstations, determining a goods distribution density value corresponding to the picking workstation according to a distance from each of the rack(s) to the picking workstation; and determining the order processing capability information of the picking workstation according to the goods distribution density value corresponding to the picking workstation.

In some embodiments, the goods distribution density value corresponding to the picking workstation is determined according to a sum of a reciprocal of the distance from each of the rack(s) to the picking workstation; or the goods distribution density value corresponding to the picking workstation is determined according to the number of a rack(s) storing at least one kind of the goods to be picked in a preset region corresponding to the picking workstation and a distance from each of the rack(s) in the preset region to the picking workstation.

In some embodiments, determining the order processing capability information of each of the plurality of picking workstations comprises: for each of the picking workstations, determining a transfer machine distribution density value corresponding to the picking workstation according to a distance from each of the available transfer machine (s) to the picking workstation; and determining the order processing capability information of the picking workstation according to the transfer machine distribution density value corresponding to the picking workstation.

In some embodiments, determining the order processing capability information of each of the plurality of picking workstations comprises: for each of the picking workstations, determining a load capacity value corresponding to the picking workstation according to at least one of a picking rate of an operator at the picking workstation or the number of a free rack buffer location(s) at the picking workstation; and determining the order processing capability information of the picking workstation according to the load capacity value corresponding to the picking workstation.

According to still other embodiments of the present disclosure, there is provided a non-transitory computer readable storage medium storing computer program instructions, when executed by a processor, cause the processor to perform: obtain an order to be picked, the order to be picked comprising a kind(s) of goods to be picked; determine order processing capability information of each of a plurality of picking workstations, according to at least one of position distribution information of a rack(s) storing at least one kind of the goods to be picked relative to each of the picking workstations, position distribution information of an available transfer machine (s) relative to each of the picking workstations, or load information of each of the picking workstation; and allocate the order to be picked to one of the picking workstations according to the order processing capability information of each of the picking workstations to pick the goods to be picked in the order to be picked at the picking workstation to which the order to be picked allocated.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute apart of this specification, illustrate embodiments of the invention, and together with the illustrative embodiments of the present application serve to explain the present disclosure, but are not limitation thereof. In the drawings.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that the order allocation method does not comprehensively consider the situation of picking workstations, racks, and transfer machines. Therefore, this order allocation and picking method is not efficient.

A technical problem to be solved by the present disclosure is how to improve the efficiency of picking goods in an order.

The present disclosure provides an inventory scheduling method that can improve the efficiency of picking goods in an order. The warehousing system of the present disclosure may comprise a management system (for example, the inventory scheduling device of the present disclosure), a plurality of rack storage locations, a plurality of racks, a plurality of automatic transfer machines, and a plurality of picking workstations.

In a case where the management system receives a picking request, it can select suitable components such as specific transfer machines, racks, picking workstations, storage locations to complete an order picking task. Each of the racks is provided with a plurality of storage compartments of the same or different sizes to store one or more kinds of goods. Each of the racks can comprise multiple working surfaces, and each of the compartments can be accessed through one or more working surfaces of the rack. An automatic transfer machine can rotate a rack as necessary to present a specific working surface and compartments on this working surface to an operator or other components of the warehousing system. In this disclosure, when goods in a rack are involved, the rack means a working surface of the rack. For example, a rack storing N kinds of goods means that a certain working surface of the rack stores N kinds of goods. In the working area of the warehouse, the automatic transfer machines carry their respective racks and shuttle along effective paths between the storage locations and the picking workstations. Unloaded automatic transfer machines without racks can shuttle among the storage locations. A buffer queue of "racks to be picked" can be set up at a location adjacent to each picking workstation to provide buffer locations for the automatic transfer machines and the racks on the automatic transfer machines.

The inventory scheduling method of the present disclosure will be described below with reference to FIG. 1.

Figure 1:
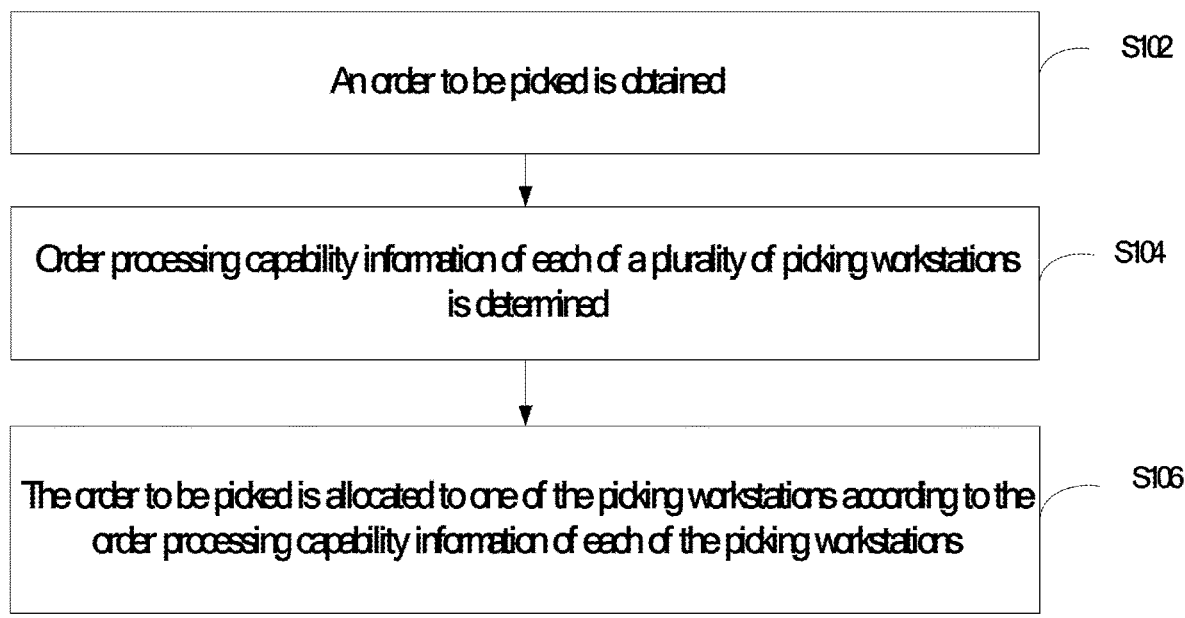
FIG. 1 is a schematic flowchart of an inventory scheduling method according to some embodiments of the present disclosure.

FIG. 1 is a flowchart of an inventory scheduling method according to some embodiments of the present disclosure. As shown in FIG. 1, the method of this embodiment comprises: steps S102 to S106.

In step S102, an order to be picked is obtained. The order to be picked comprises a kind(s) of goods to be picked.

The management system may receive one or more orders simultaneously. First, the priority of each of a plurality of orders can be determined according to at least one of a user requirement or an order type. Each of the orders is obtained in a descending order of the priority of each of the orders as the order to be picked, and the subsequent scheme is performed to allocate a picking workstation to the order. The user requirement may comprise, but not limited to, cut-off time. For example, a 2-hour delivery order has higher priority than an ordinary order. The order type can comprise ordinary order type such as single-piece (single-item orders), multiple-piece (multi-item orders), retracting supplier or bulk (for example an order in which the number of goods in the order exceeds a certain threshold), and special order type. The division of order types is not limited to the examples given above. For example, when an ordinary single-piece order and a multi-piece order arrive at the same time, the single-piece order takes priority over the multi-piece order.

Further, at least one order may be divided into an order group according to at least one of the priority or the order type of each of the at least one order. In a case where the kind(s) of goods to be picked in one order comprise the kind(s) of goods to be picked in the other order(s)'n the same order group, the orders in the same order group can be combined as a virtual combined order. The obtained order to be picked can be the virtual combined order. The number of orders contained in the virtual combined order needs to meet a limitation of an order-cache rack of a picking workstation. The order-cache rack is used for managing orders allocated to the picking workstation. The order-cache rack comprises an order slot(s). After the order is allocated to the picking workstation, it enters one order slot and leaves the order slot after picking work of the order is completed. The number of order slot(s) represents the number of order(s) that can be cached at the picking workstation. For example, if the order-cache rack of the picking workstation has only 20 order slots, in a case of picking combined orders, it is impossible to allocate 21 combined orders to the picking workstation. In a case of picking individual orders, the number of individual orders contained in the virtual combined order cannot exceed the number of free order slots, and that is a maximum of 20 individual orders can be combined to generate the virtual combined order. Types of orders contained in the combined virtual order must satisfy the order type(s) supported by the picking workstation.

For example, a group of orders (order 4 with goods A, D, G, and H, order 5 with goods A and D, order 8 with goods A, and order 9 with goods A and D) can be combined into a virtual combined order (containing goods A, D, G, and H). Once order 4 is allocated to a picking workstation, racks storing the goods in order 4 will be moved to the picking workstation. If the quantities of the goods on these racks can satisfy the picking requirements of the orders 5, 8, and 9, they can be combined into the virtual combined order, without the need of picking the goods in the orders 5, 8, and 9 from other racks or picking workstations, which may further improve efficiency.

According to actual needs, multiple orders in an order group can be combined as a virtual combined order and allocated to a picking workstation. The number of combined orders must meet the limitation of an order-cache rack of the picking workstation. The order to be picked can be the virtual combined order by combining the multiple orders.

In step S104, order processing capability information of each of a plurality of picking workstations is determined, according to at least one of position distribution information of a rack(s) storing at least one kind of the goods to be picked relative to each of the picking workstations, position distribution information of an available transfer machine(s) relative to each of the picking workstations, or load information of each of the picking workstation.

Each of the picking workstations can be configured to handle a specific order type or a specific group of order types. Also, each of the picking workstations can be provided with an order-cache rack to manage the number of orders that can be handled. Those skilled in the art can understand that, in the present disclosure, allocating an order to a picking workstation is based on the fact that the picking workstation can handle the order. Picking workstations that do not support the order type of the order, with order-cache rack having insufficient order slots, or with operators who have no authority to handle the order do not belong to picking workstations to be selected in the disclosed method.

The rack(s) storing at least one kind of the goods to be picked are described as the rack (s) for shot in the following embodiments.

In some embodiments, for each of the picking workstations, a goods distribution density value corresponding to the picking workstation is determined according to the position distribution information of the rack(s) relative to the picking workstation; a transfer machine distribution density value corresponding to the picking workstation is determined according to the position distribution information of the available transfer machine(s) relative to the picking workstation; a load capacity value corresponding to the picking workstation is determined according to the load information of the picking workstation; and a weighted sum of the goods distribution density value, the transfer machine distribution density value, and the load capacity value corresponding to the picking workstation is determined as the order processing capability information of the picking workstation.

The order processing capability information of each of the picking workstations can be determined using the following formula.

$$S = \beta_1 \cdot PDV + \beta_2 \cdot RDV + \beta_3 \cdot WLV \tag{1}$$

PDV represents a goods distribution density value. RDV represents a transfer machine distribution density value. WLV represents a load capacity value. $\beta_1$, $\beta_2$, and $\beta_3$ are the weights of PDV, RDV, and WLV, respectively.

How to determine the goods distribution density value, the transfer machine distribution density value, and the load capacity value will be described below.

In some embodiments, for each of the picking workstations, the position distribution information of the rack(s) relative to the picking workstation comprises: a distance between the picking workstation and at least one of the rack(s). The goods distribution density value corresponding to the picking workstation can be determined according to the distance between the picking workstation and the at least one of the rack(s). The greater the distance between the picking workstation and the at least one of the rack(s), the smaller the goods distribution density value corresponding to the picking workstation. In some embodiments, at least one rack is selected from the rack(s) for each picking workstation. The selected rack has stored goods that can meet the requirements of the order to be picked and is closer to the picking workstation than the other rack(s). The goods distribution density value corresponding to the picking workstation is determined according to a distance from the selected rack to the picking workstation.

In some embodiments, for each of the picking workstations, the position distribution information of the rack(s) relative to the picking workstation comprises: the number of the rack(s), and a distance from each of the rack(s) to the picking workstation. The goods distribution density value corresponding to the picking workstation is determined according to the number of the rack(s) and the distance from each of the rack(s) to the picking workstation.

For each of the picking workstations, the goods distribution density value corresponding to the picking workstation is determined according to a sum of a reciprocal of the distance from each of the rack(s) to the picking workstation. Further, the goods distribution density value corresponding to the picking workstation can be determined according to a conveying time of each of the rack(s). That is, the goods distribution density value corresponding to the picking workstation can be determined according to the distance from each of the rack(s) to the picking workstation, and a conveying speed of each of the rack(s). The goods distribution density value corresponding to the picking workstation can be determined according to the following formula. The following formula can be applied when there is one kind of goods to be picked in the order to be picked.

$$PDV = \sum_{j}^{M} \frac{V_j}{L_j} \tag{2}$$

$L_j$ represents a distance from a rack j storing the goods to be picked to the picking workstation, and the distance is a distance that takes into account a turning cost. $V_j$ represents a conveying speed of the rack j, and is an average conveying speed, for example. M represents the number of the rack(s) storing the goods to be picked. $1 \le j \le M$, where j is a positive integer. For example, a turning distance plus a straight travel distance can be taken as the distance that takes a turning cost into account.

The distance $L_j$ from the rack j to the picking workstation can be set to a preset distance, in a case where the rack j is located at the picking workstation or on a way to the picking workstation. And for a rack that is not located at the picking workstation and is not on the way to the picking workstation, a difference between a distance from the rack to the picking workstation and the preset distance is greater than a preset value. The preset distance is much smaller than the distances from the picking workstation to the racks that are not at the picking workstation and are not on the way to the picking workstation. That is, the preset distance is the minimum distance relative to the distances from the picking workstation to other racks that are not at the picking workstation and are not on the way to the picking workstation. For example, the preset distance is set to 1 m. Operators can directly pick goods from the rack located at the picking workstation or on a way to the picking workstation without additional handling. Therefore, if such a rack exists at the picking workstation, the goods distribution density value of the picking workstation is higher than that of other picking workstations, and the probability of the order to be picked being allocated to the picking workstation becomes higher.

In some embodiments, for each of the picking workstations, the goods distribution density value corresponding to the picking workstation is determined according to the number of a rack(s) storing each kind of goods to be picked and a distance between each of the rack(s) storing each kind of goods to be picked and the picking workstation. Further, the goods distribution density value corresponding to the picking workstation can be determined according to a conveying time of each of the rack(s) storing each kind of goods to be picked and the picking workstation. That is, the goods distribution density value corresponding to the picking workstation can be determined according to the distance between each of the rack(s) storing each kind of goods to be picked and the picking workstation, and a conveying speed of each of the rack(s) storing each kind of goods to be picked. The goods distribution density value corresponding to the picking workstation can be determined according to the following formula. The following formula can be applied to the case where there are multiple kinds of goods to be picked in the order to be picked.

$$PDV = 1 \bigg/ \sum_i^N \frac{1}{\sum_j^M \frac{V_{i,j}}{L_{i,j}}} \qquad (3)$$

$L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind(s) of the goods to be picked (for example, if there are 5 kinds of goods to be picked, n=5), $1 \le i \le N$, and i is a positive integer, M is the number of a rack(s) storing the goods i to be picked, $1 \le j \le M$, and j is a positive integer.

Similarly, the distance $L_{i,j}$ from the rack j to the picking workstation can be set to a preset distance, in a case where the rack j is located at the picking workstation or on a way to the picking workstation. And for a rack that is not located at the picking workstation and is not on the way to the picking workstation, a difference between a distance from the rack to the picking workstation and the preset distance is greater than a preset value. The preset distance is much smaller than the distances from the picking workstation to the racks that are not at the picking workstation and are not on the way to the picking workstation. That is, the preset distance is the minimum distance relative to the distances from the picking workstation to other racks that are not at the picking workstation and are not on the way to the picking workstation. For example, the preset distance is set to 1 m. Alternatively, in a case where the rack(s) storing the goods i to be picked is located at the picking workstation or on a way to the picking workstation, $$\sum_j^M \frac{v}{L_{i,j}}$$

can be directly set to a preset value, which is much larger than $$\sum_j^M \frac{V_{i,j}}{L_{i,j}}$$

corresponding to other goods to be picked.

Further, a region for rack selection can be set for each of the picking workstations, and the rack j storing the goods to be picked in the above formula is a rack in the preset region corresponding to the picking workstation. That is, due to the different preset region corresponding to each of the picking workstations, the number M of a rack(s) storing the goods to be picked corresponding to each of the picking workstations may be different. In the above formulas (2) and (3), M represents the number of a rack(s) storing the goods to be picked in the preset region corresponding to the picking workstation. In this case, there is no need to consider the racks in the entire warehouse, so that the amount of calculations can be reduced and the efficiency can be improved. Further, the goods distribution density value corresponding to the picking workstation is determined according to the number of the rack(s) storing at least one kind of the goods to be picked in a preset region corresponding to the picking workstation and a distance from each of the rack(s) in the preset region to the picking workstation.

The above formulas (2) and (3) can reflect the distribution of the goods to be picked relative to the picking workstation. The closer the rack(s) storing the goods to be picked to the picking workstation, the more the rack(s) storing the goods to be picked corresponding to the picking workstation, the greater the probability that the picking workstation can complete the order task in a short time, and the greater the goods distribution density value of the picking workstation.

In some embodiments, for each of the picking workstations, the position distribution information of the available transfer machine(s) relative to the picking workstation comprises: a distance between the picking workstation and at least one of the available transfer machine(s). The transfer machine distribution density corresponding to the picking workstation can be determined according to the distance between the picking workstation and the at least one of the available transfer machine(s). The greater the distance between the picking workstation and the at least one of the available transfer machine(s), the smaller the transfer machine distribution density value corresponding to the picking workstation. In some embodiments, for each of the picking workstations, at least one available transfer machine is selected from the available transfer machine(s). The number of the selected available transfer machine(s) is the same as the number of the selected rack(s) storing at least one kind of the goods to be picked. The selected transfer machine(s) is closer to the picking workstation than other available transfer machine(s). The transfer machine distribution density value corresponding to the picking workstation is determined according to the distance from each of the selected available transfer machine(s) to the picking workstation.

In some embodiments, for each of the picking workstations, the position distribution information of the available transfer machine (s) relative to the picking workstation comprises: the number of the available transfer machine(s), and a distance from each of the available transfer machine(s) to the picking workstation. The transfer machine distribution density value corresponding to the picking workstation is determined according to the number of the available transfer machine(s) and the distance from each of the available transfer machine(s) to the picking workstation.

The transfer machine distribution density value corresponding to the picking workstation can be determined according to a sum of a reciprocal of the distance from each of the available transfer machine(s) to the picking workstation. Further, the transfer machine distribution density value corresponding to the picking workstation can be determined according to a moving time of each of the available transfer machine(s). That is, the transfer machine distribution density value corresponding to the picking workstation can be determined according to the distances between each of the available transfer machine(s) and the picking workstation and the conveying speed of each of the available transfer machine(s). The transfer machine distribution density value corresponding to the picking workstation can be determined according to the following formula.

$$RDV = \sum_{k}^{P} \frac{V_k}{L_k} \quad (4)$$

$L_k$ represents a distance from a transfer machine k to the picking workstation, and the distance is a distance that takes into account a turning cost. $V_k$ represents a conveying speed of the transfer machine k, and is an average conveying speed, for example. P represents the number of the available transfer machine (s). $1 \le k \le P$, where k is a positive integer.

Further, a region for transfer machine selection can be set for each of the picking workstations, and the available transfer machine k in the above formula (4) is a transfer machine in the preset region corresponding to the picking workstation. That is, due to the different preset region corresponding to each of the picking workstations, the number P of the available transfer machine(s) corresponding to each of the picking workstations may be different. In the above formula (4), P represents the number of the available transfer machine(s) in a preset region corresponding to the picking workstation. In this case, there is no need to consider transfer machines in the entire warehouse, so that the amount of calculations can be reduced and the efficiency can be improved. Further, the transfer machine distribution density value corresponding to the picking workstation is determined according to the number of an available transfer machine(s) in the preset region corresponding to the picking workstation and a distance between the picking workstation and each of the available transfer machine(s) in the preset region corresponding to the picking workstation.

The transfer machine distribution density value reflects the distribution of the available transfer machine (s) around the picking workstation. The more available transfer machine(s) around the picking workstation, or the closer the available transfer machine (s) to the picking workstation, the greater the transfer machine distribution density value of the picking workstation, and the higher the probability that the order to be picked will be allocated to the picking workstation.

In some embodiments, for each of the picking workstations, the load information of the picking workstation comprises at least one of a picking rate of an operator at the picking workstation or the number of a free rack buffer location(s) at the picking workstation; The load capacity value corresponding to the picking workstation is determined according to at least one of the picking rate of the operator at the picking workstation or the number of the free rack buffer location(s) at the picking workstation.

In some embodiments, the load capacity value corresponding to the picking workstation is determined according to a weighted sum of the picking rate of the operator at the picking workstation and the number of the free rack buffer location(s) at the picking workstation. The load capacity value corresponding to the picking workstation can be determined according to the following formula.

$$WLV = \alpha_1 r + \alpha_2 n \quad (5)$$

r represents the picking rate. n represents the number of the free rack buffer location(s). $\alpha_1$ and $\alpha_2$ are weight coefficients of r and n, respectively.

The picking rate of the picking workstation represents an operation measure of the operator at the picking workstation. The picking rate of the picking workstation can be the number of picking orders or picks completed by a current operator within unit time, and can be obtained based on historical statistical information. For example, an average value of historical picking rates of all operators (in a certain time interval) at the picking workstation, or an average value of historical picking rates of the current operator at all picking workstations, or an average of historical picking rates of the current operator at the picking workstation is taken as the picking rate of the picking workstation.

By considering the picking rate, the management system can provide more uniform task allocation for the picking workstations in the warehousing system, or for the picking workstations and operators, or for the operators. The larger the picking rate, the greater the load capacity value of the picking workstation, and the higher the probability that the order to be picked will be allocated to the picking workstation.

The number of the free rack buffer location(s) reflects an occupancy status of a rack buffer queue of the picking workstation or how long the picking workstation will have no tasks to do. It is also possible to use an expected waiting time of a rack(s) in the rack buffer queue to reflect the occupancy of the queue and any other suitable metric can be used to replace the number of the free rack buffer location(s).

Through considering the number of the free rack buffer location(s), the management system can further preferentially select picking workstations with more free rack buffer location(s), and exclude picking workstations having no free rack buffer location(s). By taking into account the number of the free rack buffer locations(s), the management system can optimize the order picking process by limiting the amount of time the rack(s) must wait in the queue.

The weight coefficients in the above formula can be set according to actual needs, and the weight coefficients can be optimized using AI technology by an analysis of historical order picking data. The management system can adaptively adjust the weight coefficients.

In step S106, the order to be picked is allocated to one of the picking workstations according to the order processing capability information of each of the picking workstations to pick the goods to be picked in the order to be picked at the picking workstation to which the order to be picked allocated.

For each of the picking workstations, the processing capability information of the picking workstation may be calculated according to at least one of the goods distribution density value, the transfer machine distribution density value, or the load capacity value in the above embodiments. One of the picking workstations with the highest processing capability value can be selected and the order to be picked can be allocated to the selected picking workstation.

In the method of the above embodiment, several kinds of information such as the position distribution information of each of the rack(s) storing at least one kind of the goods to be picked relative to each of the picking workstations, the position distribution information of each of the available transfer machine(s) relative to each of the picking workstations, and the load information of each of the picking workstations are comprehensively considered to select one of the picking workstation for the order to be picked, in a case of allocating orders to be picked. The present disclosure considers the distribution of goods to be picked and the distribution of the available transfer machine(s), so that the rack(s) storing at least one kind of the goods to be picked can be moved to the picking workstation as soon as possible, ensuing that the order to be picked can be processed as soon as possible whiling taking into account the load information of the picking workstation. Therefore, the solution of the present disclosure improves the efficiency of picking goods in the order. Therefore, the method of the above embodiment can improve the efficiency of picking goods in the order.

After allocating the order to be picked to a picking workstation, the present disclosure also provides a method for selecting a rack and a transfer machine, and the selected rack is conveyed to the picking workstation by the transfer machine to pick the goods to be picked. The following description is given with reference to FIG. 2.

Figure 2:
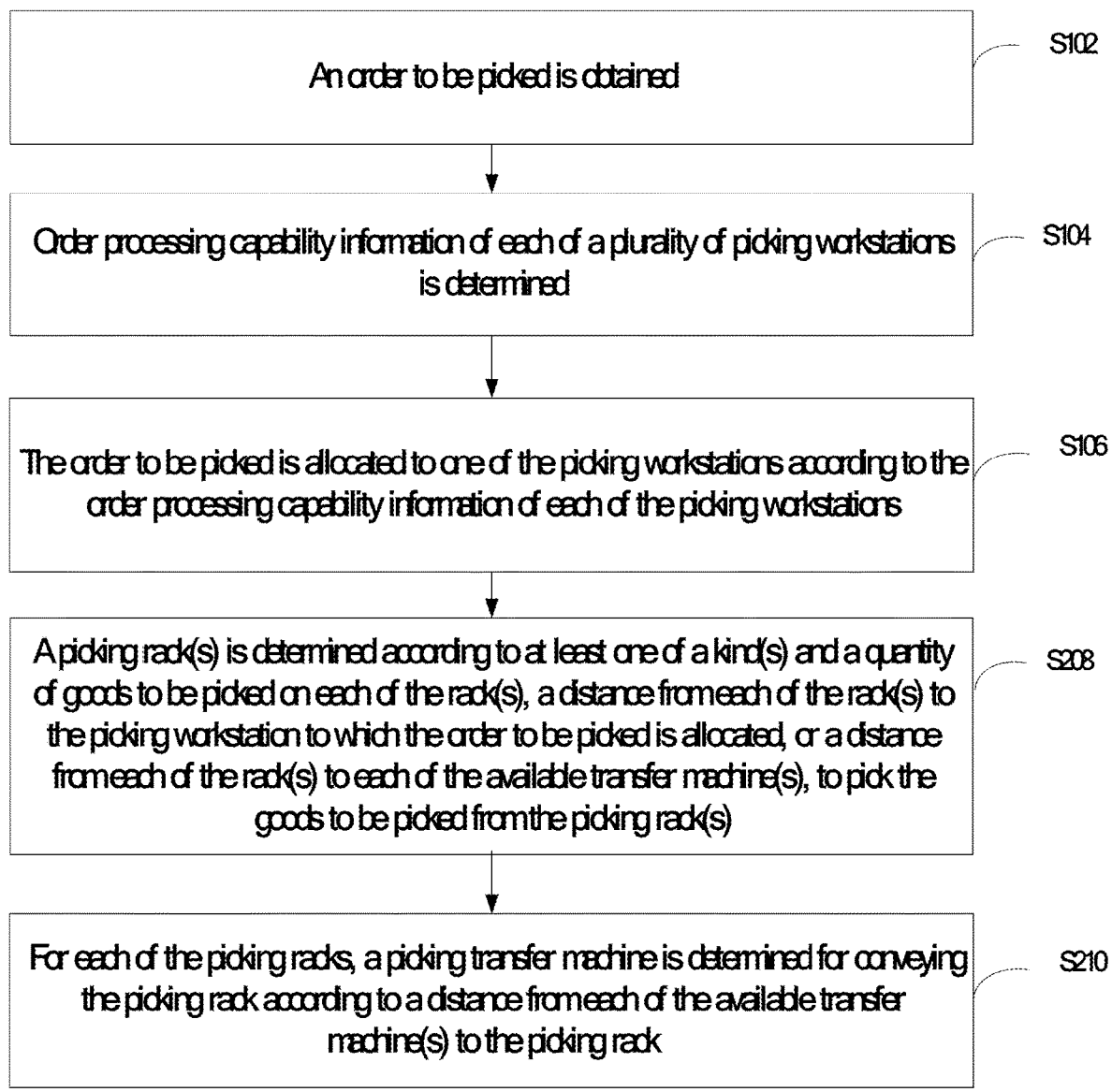
FIG. 2 is a schematic flowchart of an inventory scheduling method according to other embodiments of the present disclosure.

FIG. 2 is a flowchart of an inventory scheduling method according to other embodiments of the present disclosure. As shown in FIG. 2, after step S106, the method further comprises steps S208 to S210.

In step S208, a picking rack(s) is determined according to at least one of a kind(s) and a quantity of goods to be picked on each of the rack(s), a distance from each of the rack(s) to the picking workstation to which the order to be picked is allocated, or a distance from each of the rack(s) to each of the available transfer machine (s), to pick the goods to be picked from the picking rack(s). The picking rack(s) can also be determined according to a distance from each of the rack(s) to each of the picking workstations or a distance from each of the rack(s) to each of the picking workstations capable of handling a preset type of orders.

For example, a rack with goods whose kind(s) matches the kind(s) of the goods to be picked in the order to be picked, and the quantity of which meets the quantity specified in the order to be picked is selected as the picking rack. For another example, for each of the rack(s) storing at least one kind of the goods to be picked, a sum of the reciprocal of a distance from the rack to each of the picking workstations is calculated as a distance score, and a rack with the smallest distance score is selected as the picking rack. For another example, a sum of the reciprocal of a distance from the rack to each of the picking workstations capable of handling a preset type of orders is calculated as a distance score, and a rack with the smallest distance score is selected as the picking rack. As another example, the nearest rack to the picking workstation to which the order is allocated is selected as the picking rack. For another example, a sum of the reciprocal of a distance from the rack to each of the available transfer machine (s) is calculated as a transfer machine score and a rack with the smallest transfer machine score is selected as the picking rack.

In some embodiments, a candidate score may be determined for each of the rack(s) according to the kind(s) and quantity of goods to be picked stored on the rack, the distance to the picking workstation to which the order to be picked is allocated, and the distance to each of the transfer machine(s). A rack with the highest candidate score is used as the picking rack.

The candidate score can be calculated for each of the rack(s) according to the following formula.

$$F = \gamma_1 \cdot \Sigma_i^n N_i + \gamma_2 \cdot 1/L + \gamma_3 \cdot \Sigma_j^m 1/L_j \qquad (6)$$

$N_i$ represents a quantity of goods i to be picked on the rack. n represents the number of a kind(s) of goods to be picked on the rack (for example, if there are 5 kinds of goods to be picked on the rack, n=5). $1 \le i \le n$, and i is a positive integer. L represents a distance from the rack to the picking workstation to which the order to be picked is allocated. $L_j$ represents a distance from an available transfer machine j to the rack. m represents the number of an available transfer machine(s). $1 \le j \le m$, and j is a positive integer. $\gamma_1$, $\gamma_2$, and $\gamma_3$ represent weights of the three terms, respectively.

For a rack located at the picking workstation to which the order to be picked is allocated or on the way to the picking workstation, its candidate score is set to a preset value that is greater than that of all other racks that are not at the picking workstation and are not on the way to the picking workstation. In this way, it is possible to preferentially pick goods from such rack, and then pick the remaining goods from other racks with high candidate scores.

When selecting a picking rack, the factors or rules used may comprise, but are not limited to, a distance between each of the rack(s) and each of the transfer machine(s), a distance between each of the rack(s) and each of the picking workstations, the contents of goods stored on each of the racks, the relative position of goods to be picked on each of the rack(s), and a task currently undertaken by each of the rack(s), etc.

Further, a region for rack selection can be set for each of the picking workstations, and the rack in the above formula is a rack in the preset region of the picking workstation, without the need to consider all racks in the entire warehouse, so that the amount of calculations can be reduced and the efficiency can be improved.

In step S210, for each of the picking racks, a picking transfer machine is determined for conveying the picking rack according to a distance from each of the available transfer machine(s) to the picking rack.

For a picking rack, one of the available transfer machine (s) closest to the picking rack can be selected as the picking transfer machine. The picking transfer machine can also be determined based on a distance from each of the transfer machine(s) to the picking workstation to which the order to be picked is allocated. For example, a transfer machine with the smallest sum of a distance to the picking rack and a distance to the picking workstation to which the order to be picked is allocated is selected as the picking transfer machine.

When selecting a transfer machine and a rack, the management system can also consider a situation where a specific rack is already on the way to the picking workstation to which the order to be picked is allocated to complete another picking request, or the picking workstation to which the order to be picked is allocated is located on or near to a path that a rack will go through to complete another picking request. Therefore, the management system can prioritize the use of transfer machine(s) and rack(s) that are performing picking requests, thereby further optimizing the use of system resources and minimizing the time it takes to complete the current picking request.

In an application example, it is assumed that transfer machines A1, A2, and A3 are selected to transport racks B1, B2, and B3 to a picking workstation to complete the picking task of order 3. Transfer machines A1, A2, and A3 carrying racks B1, B2, and B3 respectively can queue or move in a queue of the picking workstation, and can be suspended one or more times as necessary to gradually reach a picking location of the picking workstation. For example, when the picking workstation is processing picking tasks for other racks, a transfer machine can be suspended in the queue one or more times until all the racks in front of it have been processed.

The present disclosure also provides an inventory scheduling device that can be used as the management system in the foregoing embodiment, which will be described below with reference to FIG. 3.

Figure 3:
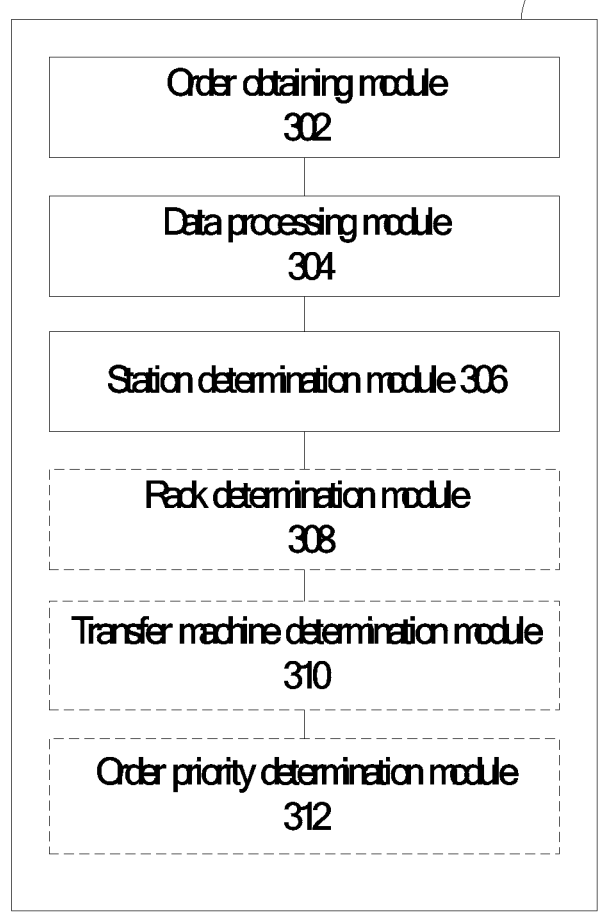
FIG. 3 is a schematic structural diagram of an inventory scheduling device according to some embodiments of the present disclosure.

FIG. 3 is a structural diagram of an inventory scheduling device according to some embodiments of the present disclosure. As shown in FIG. 3, the device 300 of this embodiment comprises: modules for executing the inventory scheduling method of any one of the foregoing embodiments. For example, the device comprises: an order obtaining module 302, a data processing module 304, and a station determination module 306.

The order obtaining module 302 is configured to obtain an order to be picked, the order to be picked comprising a kind(s) of goods to be picked.

The data processing module 304 is configured to determine order processing capability information of each of a plurality of picking workstations, according to at least one of position distribution information of a rack(s) storing at least one kind of the goods to be picked relative to each of the picking workstations, position distribution information of an available transfermachine (s) relative to each of the picking workstations, or load information of each of the picking workstation.

In some embodiments, the data processing module 304 is configured to, for each of the picking workstations, determine a goods distribution density value corresponding to the picking workstation according to the position distribution information of the rack(s) relative to the picking workstation; determine a transfer machine distribution density value corresponding to the picking workstation according to the position distribution information of the available transfer machine(s) relative to the picking workstation; determine a load capacity value corresponding to the picking workstation according to the load information of the picking workstation; and determine a weighted sum of the goods distribution density value, the transfer machine distribution density value, and the load capacity value corresponding to the picking workstation as the order processing capability information of the picking workstation.

In some embodiments, for each of the picking workstations, the position distribution information of the rack(s) relative to a picking workstation comprises: a distance between each of the rack(s) and the picking workstation. The data processing module 304 is configured to, for each of the picking workstations, determine a goods distribution density value corresponding to the picking workstation according to a distance from each of the rack(s) to the picking workstation; and determine the order processing capability information of the picking workstation according to the goods distribution density value corresponding to the picking workstation. For example, the goods distribution density value corresponding to the picking workstation is determined according to a sum of a reciprocal of the distance from each of the rack(s) to the picking workstation.

In some embodiments, for each of the picking workstations, the position distribution information of the rack(s) relative to a picking workstation comprises: the number of the rack(s) in a preset region corresponding to the picking workstation, and a distance between each of the rack(s) and the picking workstation. The data processing module 304 is configured to, for each of the picking workstations, determine the goods distribution density value according to the number of a rack(s) storing at least one kind of the goods to be picked in a preset region corresponding to the picking workstation and a distance from each of the rack(s) in the preset region to the picking workstation.

In some embodiments, the data processing module 304 is configured to determine the goods distribution density value (PDV) corresponding to the picking workstation according to the following formula:

$$PDV = 1 \Big/ \sum_{i}^{N} \frac{1}{\sum_{j}^{M} \frac{V_{i,j}}{L_{i,j}}}$$

$L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind (s) of the goods to be picked, $1 \leq i \leq N$, and i is a positive integer, M is the number of a rack(s) storing the goods i to be picked, $1 \leq j \leq M$, and j is a positive integer.

Optionally, for each of the rack(s), the distance from the rack to the picking workstation is set to a preset distance, in a case where the rack is located at the picking workstation or on a way to the picking workstation; wherein for a rack that is not located at the picking workstation and is not on the way to the picking workstation, a difference between a distance from the rack to the picking workstation and the preset distance is greater than a preset value.

In some embodiments, for each of the picking workstations, the position distribution information of the available transfer machine (s) relative to the picking workstation comprises: a distance between each of the available transfer machine(s) and the picking workstation. The data processing module 304 is configured to, for each of the picking workstations, determine a transfer machine distribution density value corresponding to the picking workstation according to a distance from each of the available transfer machine(s) to the picking workstation; and determine the order processing capability information of the picking workstation according to the transfer machine distribution density value corresponding to the picking workstation. For example, the transfer machine distribution density value corresponding to the picking workstation is determined according to a sum of a reciprocal of the distance from each of the available transfer machine(s) to the picking workstation.

In some embodiments, for each of the picking workstations, the position distribution information of the available transfer machine (s) relative to the picking workstation comprises: the number of the available transfer machine(s) in a preset region corresponding to the picking workstation, and a distance between each of the available transfer machine(s) and the picking workstation. The data processing module 304 is configured to, for each of the picking workstations, determine the transfer machine distribution density value corresponding to the picking workstation according to the number of an available transfer machine(s) in a preset region corresponding to the picking workstation and a distance from each of the available transfer machine (s) in the preset region to the picking workstation.

In some embodiments, the data processing module 304 is configured to determine the transfer machine distribution density value corresponding to a picking workstation according to the following formula:

$$RDV = \sum_{k}^{P} \frac{V_k}{L_k}$$

$L_k$ represents a distance from a transfer machine k to the picking workstation, and the distance is a distance that takes into account a turning cost. $V_k$ represents a conveying speed of the transfer machine k, and is an average conveying speed, for example. P represents the number of the available transfer machine (s). $1 \le k \le P$, where k is a positive integer.

In some embodiments, the load information corresponding to the picking workstation comprises at least one of at least one of a picking rate of an operator at the picking workstation or the number of a free rack buffer location(s) at the picking workstation. The data processing module 304 is configured to, for each of the picking workstations, determine the load capacity value corresponding to the picking workstation according to at least one of the picking rate of an operator at the picking workstation or the number of the free rack buffer location(s) at the picking workstation; and determine the order processing capability information of the picking workstation according to the load capacity value corresponding to the picking workstation.

The data processing module 304 is further configured to determine the load capacity value corresponding to the picking workstation according to a weighted sum of the picking rate of the operator at the picking workstation and the number of the free rack buffer location(s) at the picking workstation. The data processing module 304 is configured to determine the load capacity value corresponding to the picking workstation according to the following formula.

$$WLV = \alpha_1 r + \alpha_2 n$$

r represents the picking rate. n represents the number of the free rack buffer location(s). $\alpha_1$ and $\alpha_2$ are weight coefficients of r and n, respectively.

The station determination module 306 is configured to allocate the order to be picked to one of the picking workstations according to the order processing capability information of each of the picking workstations to pick the goods to be picked in the order to be picked at the picking workstation to which the order to be picked allocated.

In some embodiments, the inventory scheduling device 30 may further comprise: a rack determination module 308 configured to determine a picking rack(s) according to at least one of a kind(s) and a quantity of goods to be picked on each of the rack (s), a distance from each of the rack(s) to the picking workstation to which the order to be picked is allocated, or a distance from each of the rack(s) to each of the available transfer machine(s), to pick the goods to be picked from the picking rack(s).

Further, the inventory scheduling device 30 may further comprise: a transfer machine determination module 310 configured to, for each of the picking rack(s), determine a picking transfer machine for conveying the picking rack according to a distance from each of the available transfer machine(s) to the picking rack.

Further, the inventory scheduling device 30 may further comprise: an order priority determination module 312 configured to configured to determine a priority of each of a plurality of orders according to at least one of a user requirement or an order type, to enable the order obtaining module 302 to obtain the order to be picked from the orders according to the priority of each of the orders.

The inventory scheduling device in the embodiments of the present disclosure may be implemented by various computing devices or computer systems, which will be described below with reference to FIGS. 4 and 5.

Figure 4:
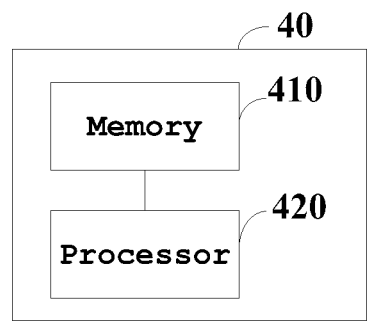
FIG. 4 is a schematic structural diagram of an inventory scheduling device according to other embodiments of the present disclosure.

FIG. 4 is a structural diagram of an inventory scheduling device according to some embodiments of the present disclosure. As shown in FIG. 4, the device 400 of this embodiment comprises memory 410 and a processor 420 coupled to the memory 410, the processor 420 configured to, based on instructions stored in the memory 410, carry out the inventory scheduling method according to any one of the embodiments of the present disclosure.

Wherein, the memory 410 may comprise, for example, system memory, a fixed non-volatile storage medium, or the like. The system memory stores, for example, an operating system, applications, a boot loader, a database, and other programs.

Figure 5:
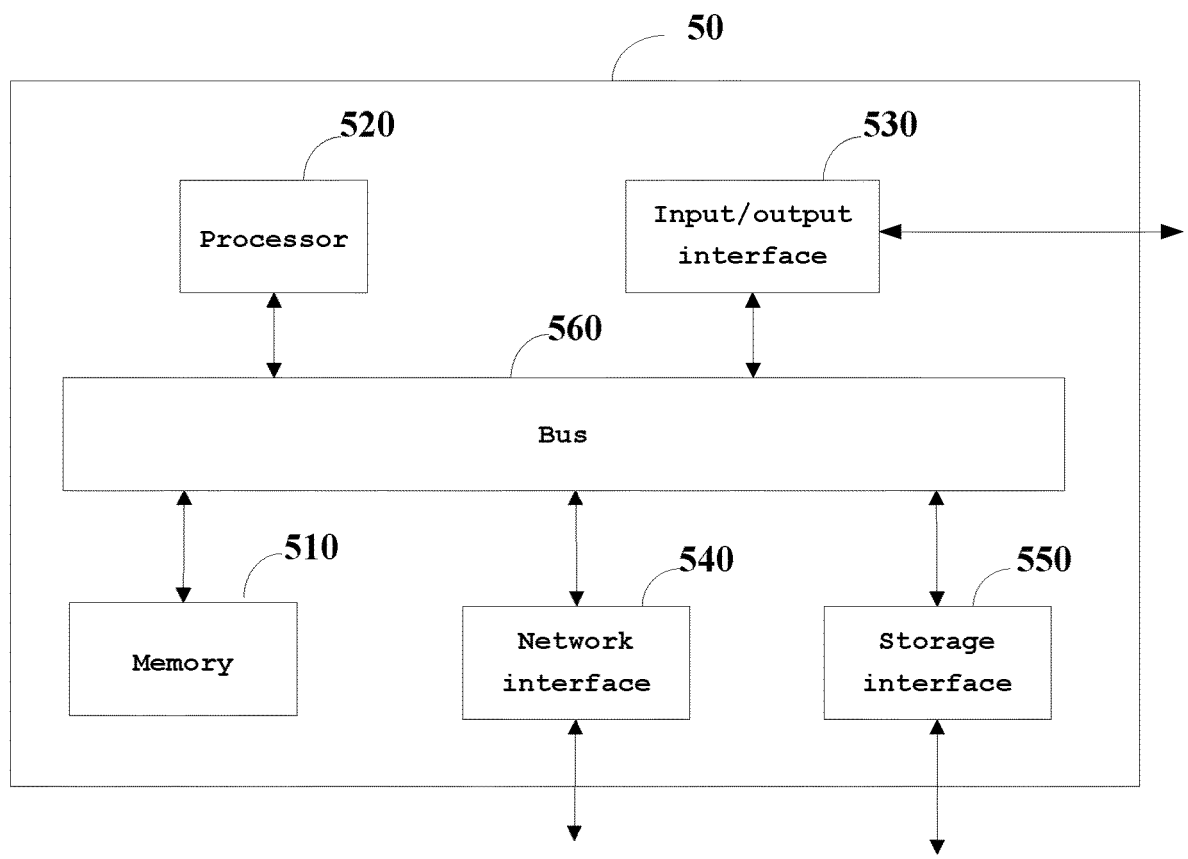
FIG. 5 is a schematic structural diagram of an inventory scheduling device according to still other embodiments of the present disclosure.

FIG. 5 is a structural diagram of an inventory scheduling device according to other embodiments of the present disclosure. As shown in FIG. 5, the device 50 of this embodiment comprises a memory 510 and a processor 520, which are similar to the memory 410 and the processor 420 respectively, and may further comprise an input-output interface 530, a network interface 540, a storage interface 550, and the like. These interfaces 530, 540, 550 and the memory 510 and the processor 520 may be connected through a bus 560, for example. The input-output interface 530 provides a connection interface for input-output devices such as a display, a mouse, a keyboard, and a touch screen. The network interface 540 provides connection interfaces for various networked devices, for example, it can be connected to a database server, a cloud storage server, or wirelessly connected to a transfer machine. The storage interface 550 provides a connection interface for external storage devices such as an SD card and a USB flash disk.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. An inventory scheduling method carried out by an inventory scheduling device, the method comprising:
    obtaining an order to be picked, the order to be picked comprising a kind(s) of goods to be picked;
    determining order processing capability information of each of a plurality of picking workstations, according to position distribution information of a rack(s) storing at least one kind of the goods to be picked relative to each of the picking workstations, position distribution information of an available transfer machine(s) relative to each of the picking workstations, and load information of each of the picking workstation including a number of a free rack buffer location(s) at each of the picking workstations, including:
        for each of the picking workstations:
            determining a goods distribution density value corresponding to the picking workstation according to a distance from each of the rack(s) to the picking workstation, and
            determining the order processing capability information of the picking workstation according to the goods distribution density value corresponding to the picking workstation;
    allocating the order to be picked to one of the picking workstations according to the order processing capability information of each of the picking workstations to pick the goods to be picked in the order to be picked at the picking workstation to which the order to be picked allocated;
    determining a picking rack(s) according to at least one of a kind(s) and a quantity of goods to be picked on each of the rack(s), a distance from each of the rack(s) to the picking workstation to which the order to be picked is allocated, and a distance from each of the rack(s) to each of the available transfer machine(s), to pick the goods to be picked from the picking rack(s);
    for each of the picking rack(s), determining a picking transfer machine for conveying the picking rack according to a distance from each of the available transfer machine(s) to the picking rack; and
    controlling the picking transfer machine to convey the picking rack(s) to the picking workstation to which the order to be picked is allocated,
    wherein the goods distribution density value (PDV) corresponding to the picking workstation is determined according to the following formula:

$$PDV = 1 \bigg/ \sum_i^N \frac{1}{\sum_j^M \frac{V_{i,j}}{L_{i,j}}}$$

where $L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind(s) of the goods to be picked, $1 \leq i \leq N$, and i is a positive integer, M is the number of a rack(s) storing the goods i to be picked, $1 \leq j \leq M$, and j is a positive integer.

2. The inventory scheduling method according to claim 1, wherein determining the order processing capability information of each of the plurality of picking workstations comprises: for each of the picking workstations,
    determining a transfer machine distribution density value corresponding to the picking workstation according to the position distribution information of the available transfer machine(s) relative to the picking workstation;
    determining a load capacity value corresponding to the picking workstation according to the load information of the picking workstation; and
    determining a weighted sum of the goods distribution density value, the transfer machine distribution density value, and the load capacity value corresponding to the picking workstation as the order processing capability information of the picking workstation.

3. The inventory scheduling method according to claim 1, wherein for each of the rack(s), the distance from the rack to the picking workstation is set to a preset distance, in a case where the rack is located at the picking workstation or on a way to the picking workstation;
wherein for a rack that is not located at the picking workstation and is not on the way to the picking workstation, a difference between a distance from the rack to the picking workstation and the preset distance is greater than a preset value.

4. The inventory scheduling method according to claim 1, wherein determining the order processing capability information of each of the plurality of picking workstations comprises: for each of the picking workstations,
determining a transfer machine distribution density value corresponding to the picking workstation according to a distance from each of the available transfer machine(s) to the picking workstation; and
determining the order processing capability information of the picking workstation according to the transfer machine distribution density value corresponding to the picking workstation.

5. The inventory scheduling method according to claim 4, wherein:
the transfer machine distribution density value corresponding to the picking workstation is determined according to a sum of a reciprocal of the distance from each of the available transfer machine(s) to the picking workstation; or
the transfer machine distribution density value corresponding to the picking workstation is determined according to the number of an available transfer machine(s) in a preset region corresponding to the picking workstation and a distance from each of the available transfer machine(s) in the preset region to the picking workstation.

6. The inventory scheduling method according to claim 1, wherein determining the order processing capability information of each of the plurality of picking workstations comprises: for each of the picking workstations,
determining a load capacity value corresponding to the picking workstation according to a picking rate of an operator at the picking workstation and the number of a free rack buffer location(s) at the picking workstation; and
determining the order processing capability information of the picking workstation according to the load capacity value corresponding to the picking workstation.

7. The inventory scheduling method according to claim 6, wherein the load capacity value corresponding to the picking workstation is determined according to a weighted sum of the picking rate of the operator at the picking workstation and the number of the free rack buffer location(s) at the picking workstation.

8. The inventory scheduling method according to claim 1, further comprising:
determining a priority of each of a plurality of orders according to at least one of a user requirement or an order type;
wherein obtaining the order to be picked comprises:
obtaining the order to be picked from the orders according to the priority of each of the orders.

9. An inventory scheduling device, comprising:
a processor; and
a memory coupled to the processor and storing instructions that when executed by the processor, cause the processor to:
obtain an order to be picked, the order to be picked comprising a kind(s) of goods to be picked;
determine order processing capability information of each of a plurality of picking workstations, according to position distribution information of a rack(s) storing at least one kind of the goods to be picked relative to each of the picking workstations, position distribution information of an available transfer machine(s) relative to each of the picking workstations, and load information of each of the picking workstation including a number of a free rack buffer location(s) at each of the picking workstations, including:
for each of the picking workstations:
determine a goods distribution density value corresponding to the picking workstation according to a distance from each of the rack(s) to the picking workstation, and
determine the order processing capability information of the picking workstation according to the goods distribution density value corresponding to the picking workstation;
allocate the order to be picked to one of the picking workstations according to the order processing capability information of each of the picking workstations to pick the goods to be picked in the order to be picked at the picking workstation to which the order to be picked allocated;
determine a picking rack(s) according to at least one of a kind(s) and a quantity of goods to be picked on each of the rack(s), a distance from each of the rack(s) to the picking workstation to which the order to be picked is allocated, and a distance from each of the rack(s) to each of the available transfer machine(s), to pick the goods to be picked from the picking rack(s);
for each of the picking rack(s), determine a picking transfer machine for conveying the picking rack according to a distance from each of the available transfer machine(s) to the picking rack; and
control the picking transfer machine to convey the picking rack(s) to the picking workstation to which the order to be picked is allocated,
wherein the goods distribution density value (PDV) corresponding to the picking workstation is determined according to the following formula:

$$PDV = 1 \bigg/ \sum_i^N \frac{1}{\sum_j^M \frac{V_{i,j}}{L_{i,j}}}$$

where $L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind(s) of the goods to be picked, $1 \leq i \leq N$, and i is a positive integer, M is the number of a rack(s) storing the goods i to be picked, 1≤j≤M, and j is a positive integer.

10. The inventory scheduling device according to claim 9, wherein determining the order processing capability information of each of the plurality of picking workstations comprises: for each of the picking workstations,
determining a transfer machine distribution density value corresponding to the picking workstation according to the position distribution information of the available transfer machine(s) relative to the picking workstation;
determining a load capacity value corresponding to the picking workstation according to the load information of the picking workstation; and
determining a weighted sum of the goods distribution density value, the transfer machine distribution density value, and the load capacity value corresponding to the picking workstation as the order processing capability information of the picking workstation.

11. The inventory scheduling device according to claim 9, wherein determining the order processing capability information of each of the plurality of picking workstations comprises: for each of the picking workstations,
determining a transfer machine distribution density value corresponding to the picking workstation according to a distance from each of the available transfer machine(s) to the picking workstation; and
determining the order processing capability information of the picking workstation according to the transfer machine distribution density value corresponding to the picking workstation.

12. The inventory scheduling device according to claim 9, wherein determining the order processing capability information of each of the plurality of picking workstations comprises: for each of the picking workstations,
determining a load capacity value corresponding to the picking workstation according to a picking rate of an operator at the picking workstation and the number of a free rack buffer location(s) at the picking workstation; and
determining the order processing capability information of the picking workstation according to the load capacity value corresponding to the picking workstation.

13. A non-transitory computer-readable storage medium storing computer program instructions, when executed by a processor, cause the processor to perform:
obtain an order to be picked, the order to be picked comprising a kind(s) of goods to be picked;
determine order processing capability information of each of a plurality of picking workstations, according to position distribution information of a rack(s) storing at least one kind of the goods to be picked relative to each of the picking workstations, position distribution information of an available transfer machine(s) relative to each of the picking workstations, and load information of each of the picking workstation including a number of a free rack buffer location(s) at each of the picking workstations, including:
for each of the picking workstations:
determine a goods distribution density value corresponding to the picking workstation according to a distance from each of the rack(s) to the picking workstation, and
determine the order processing capability information of the picking workstation according to the goods distribution density value corresponding to the picking workstation;
allocate the order to be picked to one of the picking workstations according to the order processing capability information of each of the picking workstations to pick the goods to be picked in the order to be picked at the picking workstation to which the order to be picked allocated;
determine a picking rack(s) according to at least one of a kind(s) and a quantity of goods to be picked on each of the rack(s), a distance from each of the rack(s) to the picking workstation to which the order to be picked is allocated, and a distance from each of the rack(s) to each of the available transfer machine(s), to pick the goods to be picked from the picking rack(s);
for each of the picking rack(s), determine a picking transfer machine for conveying the picking rack according to a distance from each of the available transfer machine(s) to the picking rack; and
control the picking transfer machine to convey the picking rack(s) to the picking workstation to which the order to be picked is allocated,
wherein the goods distribution density value (PDV) corresponding to the picking workstation is determined according to the following formula:

$$PDV = 1 \bigg/ \sum_{i}^{N} \frac{1}{\sum_{j}^{M} \frac{V_{i,j}}{L_{i,j}}}$$

where $L_{i,j}$ represents a distance from a rack j storing a goods i to be picked to the picking workstation, and the distance is a distance that takes into account a turning cost, $V_{i,j}$ represents a conveying speed of the rack j storing the goods i to be picked, N is the number of the kind(s) of the goods to be picked, 1≤i≤N, and i is a positive integer, M is the number of a rack(s) storing the goods i to be picked, 1≤j≤M, and j is a positive integer.

* * * * *